(12) United States Patent
Barry (10) Patent No.: US 10,071,862 B1
(45) Date of Patent: Sep. 11, 2018

(54) AUTOMATED TENSIONING SYSTEM FOR CABLE OR CHAIN CONVEYOR

(71) Applicant: Flexicon Corporation, Bethlehem, PA (US)

(72) Inventor: Daniel Joel Barry, Bethlehem, PA (US)

(73) Assignee: Flexicon Corporation, Bethlehem, PA (US)

(*) Notice: Subject to any disclaimer, the term of this patent is extended or adjusted under 35 U.S.C. 154(b) by 0 days.

(21) Appl. No.: 15/916,782

(22) Filed: Mar. 9, 2018

Related U.S. Application Data

(60) Provisional application No. 62/469,657, filed on Mar. 10, 2017.

(51) Int. Cl.
| | |
|---|---|
| B65G 23/44 | (2006.01) |
| B65G 43/02 | (2006.01) |
| B65G 23/06 | (2006.01) |
| B65G 23/24 | (2006.01) |
| B65G 43/06 | (2006.01) |
| G01L 5/00 | (2006.01) |
| G01L 5/04 | (2006.01) |

(52) U.S. Cl.
CPC ............ *B65G 23/44* (2013.01); *B65G 23/06* (2013.01); *B65G 23/24* (2013.01); *B65G 43/02* (2013.01); *B65G 43/06* (2013.01); *B65G 2207/24* (2013.01); *G01L 5/0057* (2013.01); *G01L 5/04* (2013.01)

(58) Field of Classification Search
CPC ........ B65G 23/06; B65G 23/24; B65G 43/02; B65G 43/06

USPC ................... 198/810.04, 813, 814
See application file for complete search history.

(56) References Cited

U.S. PATENT DOCUMENTS

| | | | |
|---|---|---|---|
| 5,030,173 A | 7/1991 | Bryant | |
| 5,660,237 A * | 8/1997 | Boyko | A01B 73/067 172/311 |
| 6,860,384 B2 * | 3/2005 | Baumeister | B65G 23/24 198/832.1 |
| 7,117,989 B2 * | 10/2006 | Weigel | B65G 23/44 198/810.04 |
| 7,140,486 B2 * | 11/2006 | Kim | F16H 7/08 198/810.03 |

(Continued)

FOREIGN PATENT DOCUMENTS

CN          201581213          9/2010

*Primary Examiner* — Douglas A Hess
(74) *Attorney, Agent, or Firm* — Volpe and Koenig, P.C.

(57) ABSTRACT

An automated tensioning system is provided for a conveyor. The tensioning system includes a spring housing with a lead screw/drive shaft assembly located therein that has a pushing face that extends out of one housing end. A spring compression plate is threadingly engaged with the lead screw. A plate indicator is located on the spring compression plate. A tensioner spring is located between the tensioner spring support provided by a first housing end and the spring compression plate. A sensor is located on the spring housing that is configured to detect a position of the plate indicator. A driven wheel, rotationally engaged with the drive shaft and axially slideable thereon, is driven by a motor to drive the driven wheel and rotate the lead screw and advance or retract the face so that a desired tension is maintained.

18 Claims, 6 Drawing Sheets

(56) References Cited

U.S. PATENT DOCUMENTS

| | | | |
|---|---|---|---|
| 7,798,313 B2 * | 9/2010 | Hesketh | B65G 23/44 |
| | | | 198/814 |
| 7,837,021 B2 * | 11/2010 | Ichikawa | B66B 23/18 |
| | | | 198/329 |
| 8,801,904 B2 | 8/2014 | Miller et al. | |
| 8,960,417 B2 * | 2/2015 | Vasey | B65G 21/14 |
| | | | 198/812 |
| 9,221,617 B2 * | 12/2015 | Waller | B65G 23/44 |
| 9,598,241 B2 * | 3/2017 | Voigt | B65G 23/44 |
| 9,598,248 B2 * | 3/2017 | Raiche | B65G 19/14 |
| 9,738,453 B2 * | 8/2017 | Cerny | B65G 23/44 |
| 9,795,940 B2 * | 10/2017 | Miller | B01J 6/008 |
| 9,809,389 B2 * | 11/2017 | Pauli | B65G 23/44 |
| 2002/0175054 A1 | 11/2002 | Ellis et al. | |
| 2005/0187053 A1 | 8/2005 | Kim | |
| 2005/0192142 A1 | 9/2005 | Stone et al. | |
| 2010/0270130 A1 | 10/2010 | Tout | |
| 2010/0276259 A1 | 11/2010 | Phalen | |
| 2015/0360875 A1 | 12/2015 | Tout et al. | |

\* cited by examiner

AUTOMATED TENSIONING SYSTEM FOR CABLE OR CHAIN CONVEYOR

INCORPORATION BY REFERENCE

The following documents are incorporated herein by reference as if fully set forth: U.S. Provisional Patent Application No. 62/469,657, filed Mar. 10, 2017.

BACKGROUND

The present invention generally relates to a drag conveyor, which can be a cable or chain conveyor. Such conveyors are known and generally include an outer tube through which an endless cable, chain or other traction element is drawn. Disks of flights are attached to the traction element at periodic intervals and, by moving the traction element in a transport direction, powdered or granular material that is fed through an opening in the tube into spaces between disks is carried forward through the tube to an unloading point where the tube is open in a bottom area so that the material can be discharged.

Such conveyors are useful for moving powdered or granular materials without damaging or breaking down the material which can occur with augur-type tube conveyors. Since the material is merely pushed along the inside of the tube by the disks which are attached to the conveyor traction element, the likelihood of damage to the granular material being transported is greatly reduced.

In order to maintain smooth operation, the traction element needs to be maintained at a predetermined tension or within a predefined range. Tensioning is typically accomplished by manually adjusting the position of a return sprocket or pulley for the traction element. However, this requires periodic maintenance due to stretching of the traction element, and does not account for the influence of the goods being conveyed.

SUMMARY

An automated tensioning system is provided, preferably for a drag conveyor with an endless traction element that travels around an adjustably mounted pulley or sprocket. The tensioning system includes a spring housing having first and second housing ends opposite one another. The first housing end acts as a tensioner spring support. A lead screw/drive shaft assembly is provided that includes a threaded lead screw connected with a drive shaft located in the spring housing. The lead screw/drive shaft assembly has a pushing face that extends out of one of the housing ends. A spring compression plate is located in the spring housing and threadingly engages with the lead screw. The spring compression plate includes an indicator and an anti-rotation element. A tensioner spring is located between the tensioner spring support and the spring compression plate. A sensor is located on the spring housing that is configured to detect a position of the indicator. A driven wheel is rotationally engaged with the drive shaft and axially slideable thereon. A motor is provided that drives the driven wheel, and a controller is provided that is configured to receive position data from the sensor and to actuate the motor to drive the driven wheel in a first or second rotational direction to rotate the lead screw and advance or retract the lead screw in the spring compression plate to maintain or move the pushing face to a desired position and to adjust a tensioning force of the tensioner spring.

In one embodiment, the spring housing includes at least one longitudinal opening, and the indicator is a plate indicator that extends through the longitudinal opening and simultaneously acts as the anti-rotation element.

In another aspect, the lead screw extends through a forward guide bushing mounted to the second end, and the drive shaft extends through a rear guide bushing mounted to the first end. This provides for smooth guiding movement of the lead screw and the drive shaft.

Preferably, the drive shaft is coupled to the lead screw with a coupling sleeve. Alternatively, they can be screwed, keyed, welded or otherwise connected together, or possibly formed as a single part.

In another aspect, a drive element connects the motor and the driven wheel. The drive element can include a drive wheel located on the motor, and a belt or chain drivingly engaged between drive wheel and the driven wheel. Alternatively, the drive element can be a toothed drive wheel that engages the driven wheel which is also toothed.

In one arrangement, the sensor includes first and second position sensors. These can be located on either side of the plate indicator in order to sense its position and signal the controller when the plate indicator moves outside of a preferred location range. The sensors can be proximity switches, contact switches, break-beam sensors, or any other suitable sensor type.

In another embodiment, the sensor comprises a linear position sensor that extends parallel to the lead screw/drive shaft assembly and the indicator comprises a magnet connected to the spring compression plate. In this case, it is also possible to provide a second position indicator, preferably in the form of a second magnet, axially fixed to the lead screw/drive shaft assembly that is detected by the linear position sensor. This allows the controller to recognize the position of the lead screw so that it does not attempt to actuate the motor to drive the lead screw beyond its end limits Preferably, a wrench engagement surface is located on an end of the drive shaft. This allows for manual adjustment.

In one arrangement, a nut is welded to the spring compression plate to provide for the threaded engagement with the lead screw.

In a preferred arrangement, the second end of the spring housing acts as a mounting plate.

In one arrangement, the motor is mounted to the second housing end.

In another aspect, a conveying system is provided having the tensioning system discussed above. Here, a sprocket assembly is provided that carries the endless traction element. The sprocket assembly is mounted to a slideable carriage that is located in a sprocket enclosure. The second end of the spring housing is in proximity to or connected to the sprocket enclosure such that the pushing face contacts the slideable carriage to apply a tensioning force.

Preferably, longitudinally extending mounting rods are located in the sprocket enclosure, and the slideable carriage is located on the longitudinally extending mounting rods.

An endless traction element extends around the sprocket assembly and through a conveying tube. Disks or flights are connected to the endless traction element that are adapted to carry granular or powdered product through the conveying tube.

The above-noted features can be used either alone or in various combinations with one another in order to provide the automated tensioning system and/or the conveying system in accordance with the invention.

BRIEF DESCRIPTION OF THE DRAWINGS

The foregoing Summary as well as the following Detailed Description will be readily understood in conjunction with the appended drawings which illustrate preferred embodiments of the invention. In the drawings.

DETAILED DESCRIPTION OF THE PREFERRED EMBODIMENTS

Certain terminology is used in the following description for convenience only and is not considered limiting. The words "right," "left," "lower" and "upper" designate directions in the drawings to which reference is made. This terminology includes the words specifically noted above, derivatives thereof and words of similar import. Additionally, the terms "a" and "one" are defined as including one or more of the referenced items unless specifically noted. As used herein, "traction element" refers to a cable, chain, belt, or other flexible element that can be drawn through a tube to provide a form of motion generation for the disks or flights.

Figure 1:
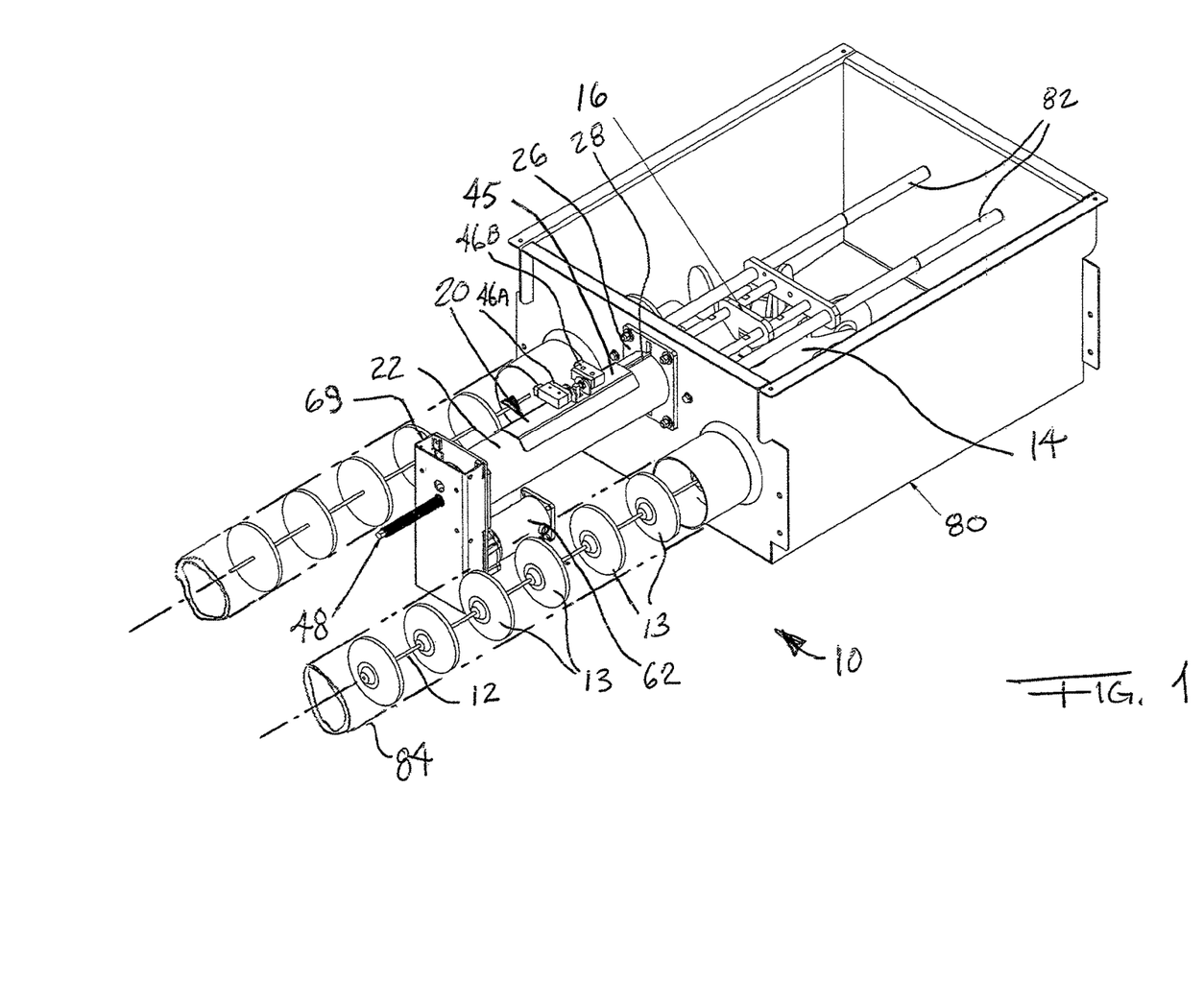
FIG. 1 is a perspective view of a conveying system having a first embodiment of a tensioning system.
Figure 2:
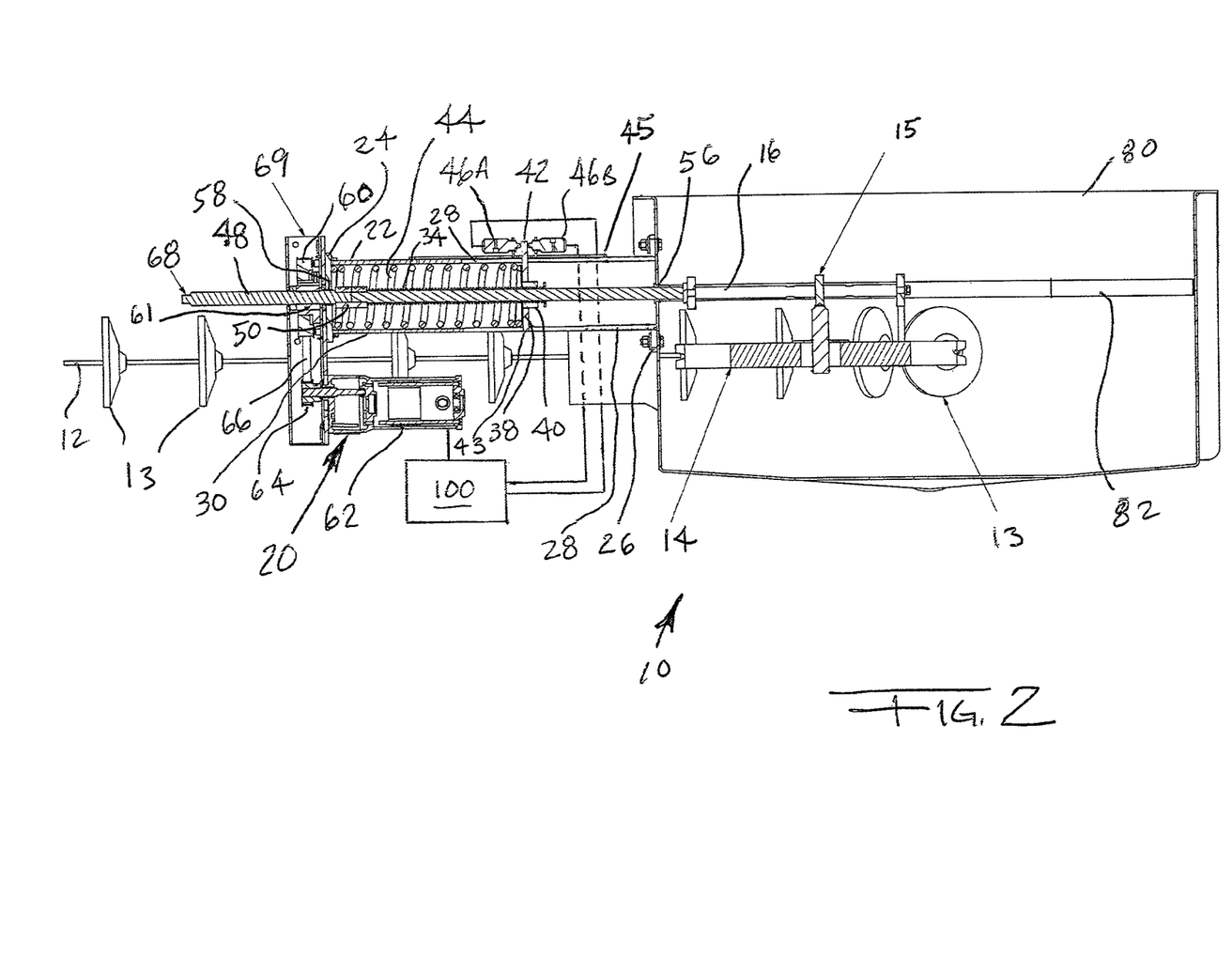
FIG. 2 is a cross-sectional view through the conveying system and tensioning system shown in FIG. 1.
Figure 3:
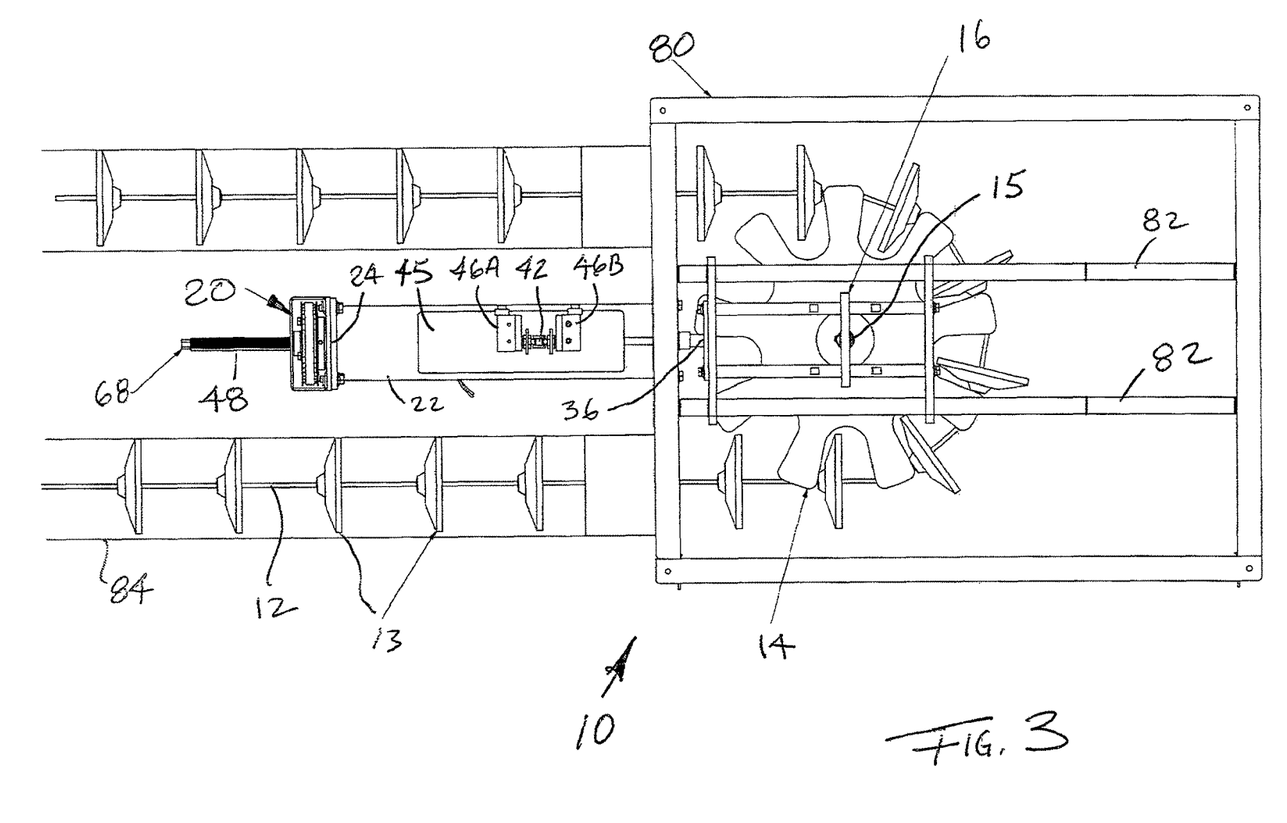
FIG. 3 is a top view of the conveying system and tensioning system shown in FIG. 1.

Referring to FIGS. 1-3, a conveying system 10 which includes a tensioning system 20 in accordance with a first preferred embodiment of the invention is shown. The conveying system 10 includes an endless traction element 12 with flights or disks 13 located thereon that travel around an adjustably mounted pulley or sprocket assembly 14. The sprocket assembly 14 rotatably mounted on a shaft 15 connected to a slideable carriage 16. The sprocket assembly 14 and slideable carriage 16 are located within a sprocket enclosure 80, the cover being removed in FIGS. 1-3 for clarity. Mounting rods 82 are located in the sprocket enclosure and the slideable carriage 16 is located on these longitudinally extended mounting rods 82. The endless traction element 12 extends through a conveying tube 84 and the disks or flights 13 connected to the endless traction element 12 are adapted to carry a granular or powdered product through the conveying tube 84.

Referring to FIGS. 1-4, in order to maintain proper tension on the endless traction element 12, a first embodiment of the tensioning system 20 is shown. The tensioning system 20 includes a spring housing 22 having a first end 24 and a second end 26 located opposite one another. The spring housing 22 can be formed with a cylindrical wall or straight sided walls extending between the two ends 24, 26, or could be formed of an open structure, such as four rods connected between the two ends 24, 26. At least one longitudinal opening 28 extends through the spring housing 22. In the illustrated embodiment, the longitudinal opening 28 is a longitudinal slot 28 through the sidewall 30 of the spring housing 22. As can be seen in FIG. 2, the longitudinal slot 28 preferably extends through opposing sides of the spring housing 22, at least in proximity to the second end 26. The first housing end 24 acts as a tensioner spring support.

A lead screw/drive shaft assembly 33 including a threaded lead screw 34 connected with a drive shaft 48 is located in the spring housing 22. The lead screw/drive shaft assembly 33 includes a pushing face 36 that extends out of the one of the housing ends, preferably the second housing end 26. A spring compression plate 38 is threadingly engaged with the lead screw 34. Preferably, a nut 40 is connected to the spring compression plate 38 in order to provide the threaded engagement with the lead screw 34. Preferably, the spring compression plate 38 is made of metal and the nut 40 is welded to the spring compression plate 38. Alternatively, depending on the thickness of the plate 38, the thread can be formed directly in an opening in the plate 38. The lead screw 34 and the nut 40 preferably have an acme thread that is self-locking when an axial load is applied.

Figure 4:
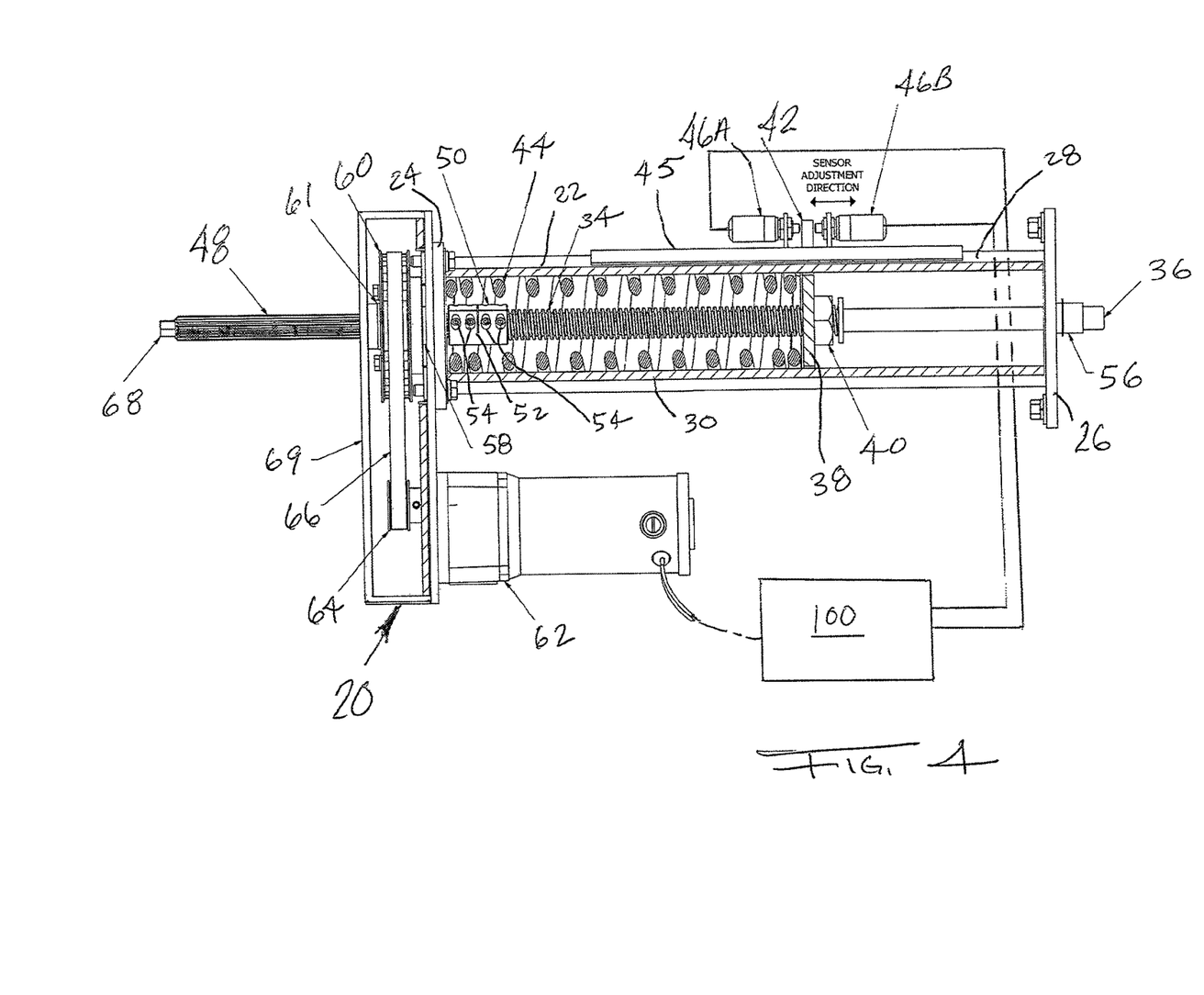
FIG. 4 is an enlarged detailed cross-sectional view through the first embodiment of the tensioning system shown in FIG. 1.

The spring compression plate 38 preferably includes an indicator, shown in detail in FIGS. 2 and 4. The indicator in the first embodiment comprises a plate indicator 42 having a tab shape that extends through the longitudinal opening 28. Preferably, as shown in FIG. 2, a guide projection 43 extends from an opposite side of the spring compression plate 38 from the plate indicator 42 and also extends into an opposing longitudinal opening 28 in the spring housing 22. The shape of the spring compression plate 38 could also provide the guiding function, for example, by having a square or rectangular shape if the spring housing 22 has a square or rectangular interior cross-section, or by having lobes that extend partially between and are guided by rods if the spring housing 22 is formed with an arrangement of rods extending between the two ends 24, 26. This maintains the alignment of the spring compression plate 38 and helps to prevent rotation with the lead screw 48.

A tensioner spring 44 is located between the tensioner spring support formed by the first end 24 of the housing 22 and the spring compression plate 38. The tensioner spring 44 is preferably a coil spring. A sensor 46a, 46b is located on the spring housing 22 that is configured to detect a position of the plate indicator 42. Preferably, the sensor comprises first and second position sensors 46a, 46b. These are illustrated as proximity switches which are contacted by the plate indicator 42 when it travels beyond a certain defined range. Alternatively, contactless sensors such as a break-beam sensor could be utilized, as well as any other suitable position sensor. Preferably, the first and second position sensors 46a, 46b are mounted on a cover 45 that is located on the spring housing 22 and covers the longitudinally extending slot 28. The cover 45 can be moved and locked in position at various locations along the length of the spring housing 22 depending upon the particular tensioning requirements desired.

The drive shaft 48 is rotationally fixed to the lead screw 34. The drive shaft 48 is preferably coupled to the lead screw 34 using a coupling sleeve 50. The coupling sleeve 50, shown in detail in FIG. 4, can include a slot 52 that separates the lead screw connection end from the drive shaft connection end and screws 54 that can be tightened on each side of the slot 52 in order to securely clamp the lead screw 34 and the drive shaft 48 to the coupling sleeve 50 in a rotationally fixed manner. Alternatively, the drive shaft 48 can be fixed to the lead screw 34 using other means, such as a keyed, welded, or threaded connection, or the drive shaft 48 and the lead screw 34 could be formed as one piece. The drive shaft 48 is preferably splined or has a non-round shape in cross-section that extends consistently along its length to provide a rotational drive feature. In additional to known spline arrangements, this could include a hexagonal shape, a square shape, a circular shape with a flat, or any other known rotational drive shape.

Referring to FIG. 4, in the first embodiment of the tensioning system 20, the lead screw 34 extends through a forward guide bushing 56 mounted to the second end 26 of the spring housing 22, and the drive shaft 48 extends through a rear guide bushing 58 mounted on the first end 24 of the spring housing 22. The guide bushings 56, 58 provide for smooth rotational support and guidance of the assembled lead screw 34 and drive shaft 48.

In a preferred embodiment, a wrench engagement surface 68, such as a hexagonal shaped end, is provided on an end of the lead screw/drive shaft assembly 33. In the first embodiment of the tensioning system 20, this is provided at the outer end of the drive shaft 48. This allows for a manual engagement with a wrench in order to provide for a manual adjustment of the tensioning system, if necessary.

Still with reference to FIGS. 2 and 4, a driven wheel 60 is rotationally engaged with the drive shaft 48 and is axially slideable thereon. Preferably, a spline or other complementary shaped bushing 61 is located within the driven wheel and locked in rotation with the driven wheel 60 that includes teeth or a corresponding shape to the rotational drive feature that are aligned with and slideable on the drive shaft 48. This provides for rotational engagement of the driven wheel 60 with the drive shaft 48 while allowing for the axial sliding movement of the drive shaft 48 as the lead screw 34 is advanced or retracted.

As shown in FIGS. 1-4, a motor 62 is provided that drives the driven wheel 60. Preferably, a drive element connects the motor 62 to the driven wheel 60. This drive element can be a drive wheel 64 located on the motor 62 and a belt or chain 66 drivingly engaged between the drive wheel 64 and the driven wheel 60. Alternatively, the driven wheel 60 can have teeth and the drive wheel 64 can be a toothed gear that engages with the teeth of the driven wheel 60.

As shown in FIGS. 2 and 4, a bushing bracket 69 is provided for supporting the complementary shaped bushing 61. This is preferably connected to the first end 24 of the spring housing 22.

As shown in FIGS. 2 and 4, a controller 100 is provided that is configured to receive position data from the position sensor 46a, 46b, preferably the two position sensors, 46a, 46b, and to actuate the motor 62 to drive the driven wheel 60 in a first rotational direction or a second rotational direction to rotate the lead screw 34 and advance or retract the lead screw 34 in the spring compression plate 38 to maintain or move the pushing face 36 to a desired position. This adjusts a tensioning force of the tensioner spring 44 located between the spring compression plate 38 and the first end 24 of the spring housing 22 to compensate for stretching of the traction element 12 or the load being carried. The controller 100 can be a PLC or any other programmable IC that can be programmed to provide for driving the motor 62 either in the clockwise or counterclockwise direction in order to adjust the lead screw 34 until the plate indicator 42 is within the desired positional range. This ensures that proper tension is applied via the pushing face 36 acting against the slideable carriage 16 as shown in FIG. 3 so that the sprocket assembly 14 applies proper tension to the endless traction element 12 carried thereon.

As shown in FIG. 1, preferably the second end 26 of the spring housing 22, acts as a mounting plate for fixing the tensioning system 20 to the sprocket enclosure 80. This allows the pushing face 36 to contact the slideable carriage 16 to apply the tensioning force. Other connections could also be provided between the lead screw/drive shaft assembly 33 and the slideable carriage 16, as would be understood by those of ordinary skill in the art based on the present disclosure.

Figure 5:
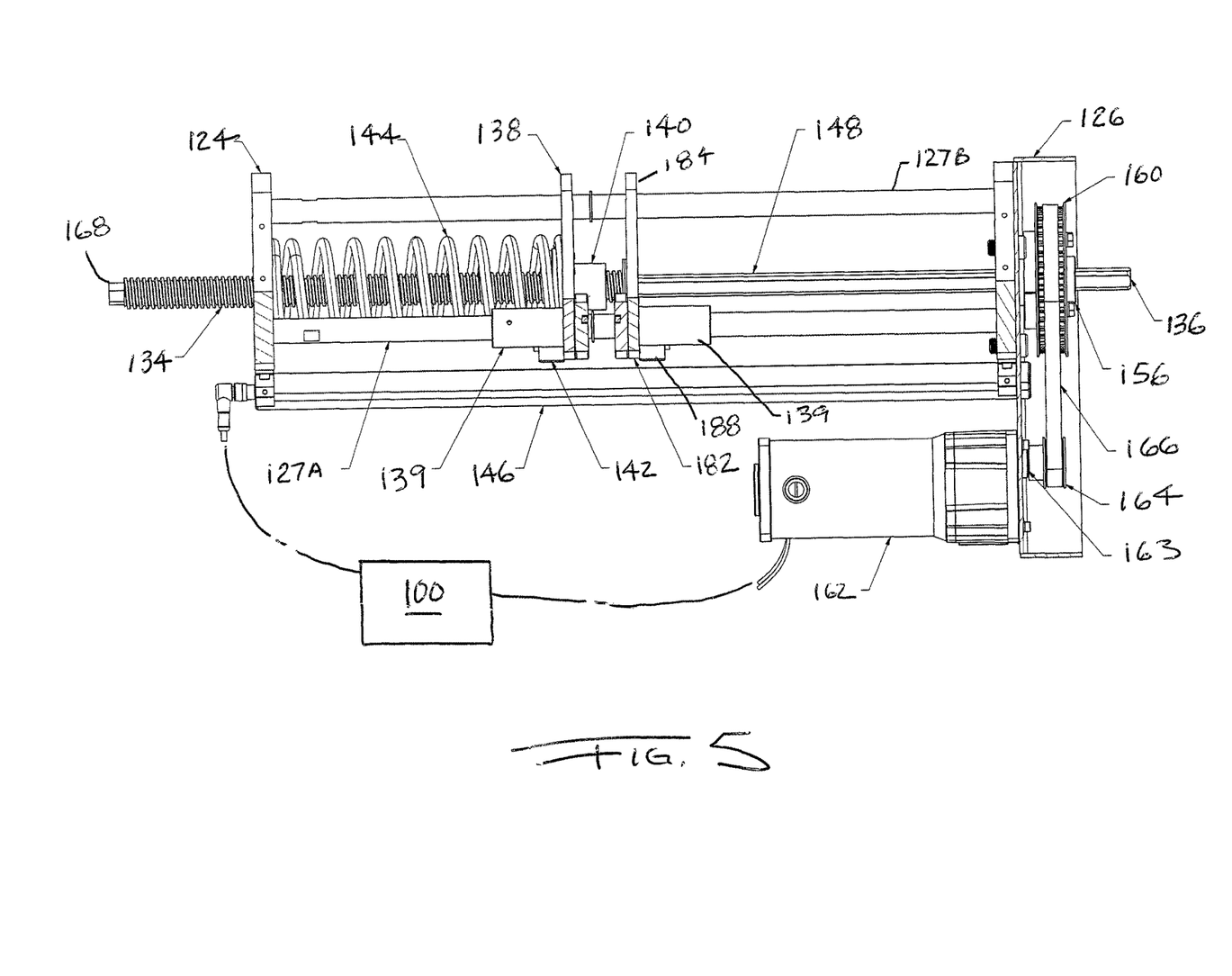
FIG. 5 is a side view of a second embodiment of a tensioning system that can be used in connection with the conveying system of FIGS. 1-3.
Figure 6:
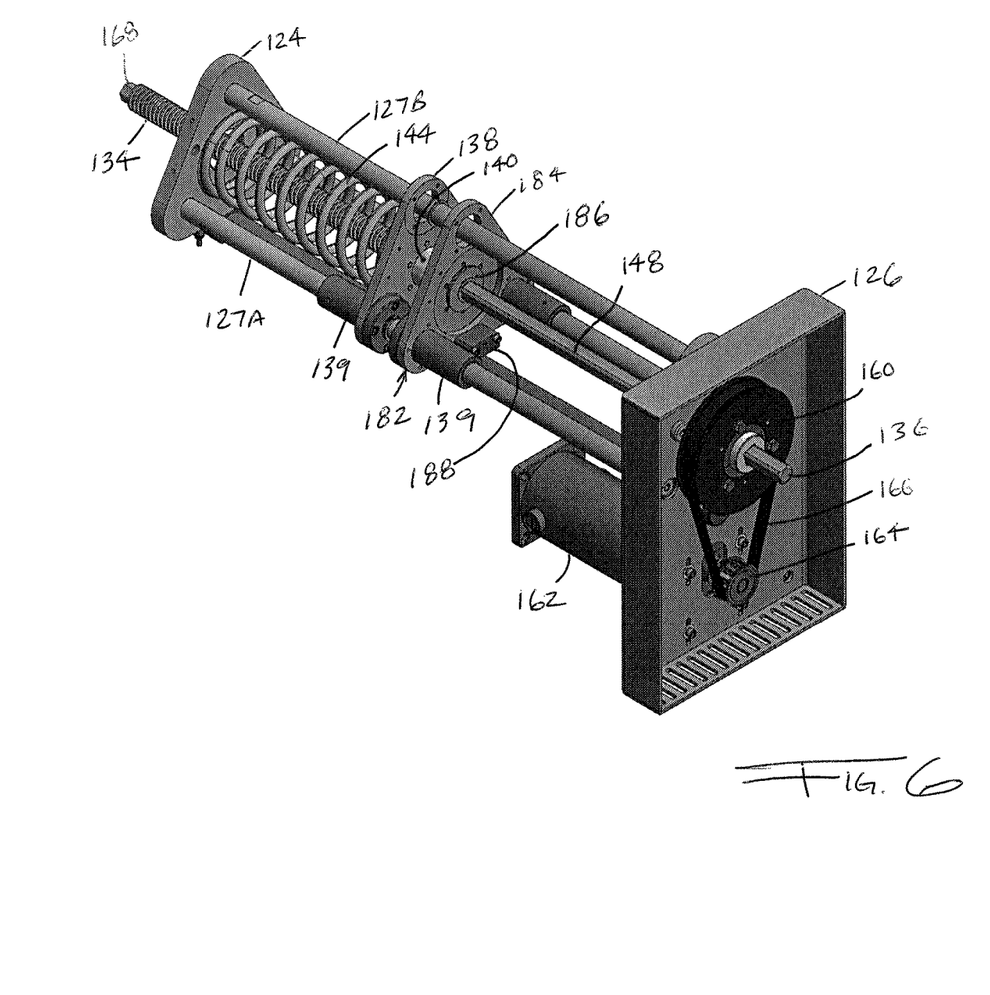
FIG. 6 is a perspective view of the second embodiment of the tensioning system shown in FIG. 5.

Referring now to FIGS. 5 and 6, a second embodiment of the tensioning system 120 is provided. The tensioning system 120 can be installed in place of the tensioning system 20 shown in FIG. 1 in order to tension the illustrated conveying system.

The tensioning system 120 includes a spring housing 122 having a first end 124 and a second end 126 located opposite one another. Here the two ends 124, 126 are spaced apart by 3 rods 127A-C connected between the two ends 124, 126. A cover (not shown) is preferably installed over the rods 127A-C and connected to the two ends 124, 126 to prevent injury as well as to prevent debris from entering the tensioning system 120. The first housing end 124 acts as a tensioner spring support.

A lead screw/drive shaft assembly 133 including a threaded lead screw 134 connected with a drive shaft 148 is located in the spring housing 122. The lead screw/drive shaft assembly 133 includes a pushing face 136, which in this embodiment is located on the end of the drive shaft 148, and extends out of the one of the housing ends, preferably the second housing end 126. In comparison to the first embodiment 20, this provides a reduced envelope for the tensioner system and also allows the motor 162 to be mounted closer to the support structure provided by the sprocket enclosure 80 of the conveying system. Further, the pushing face 136 is here located at the end of the drive shaft 148, which faces the conveyor system sprocket.

A spring compression plate 138 is threadingly engaged with the lead screw 134. Preferably, a nut 140 is connected to the spring compression plate 138 in order to provide the threaded engagement with the lead screw 134. Preferably, the spring compression plate 138 is constructed in a similar manner to the spring compression plate 38. In one preferred embodiment, the nut 140 is made of a self-lubricating material and is mechanically fastened to the spring compression plate 138. The lead screw 134 and the nut 140 preferably have an acme thread that is self-locking when an axial load is applied.

As an anti-rotation device, a linear bearing 139 is slidably mounted on the at least one rod 127A-C that extends between the first and second housing ends 124, 126 and acts as a guide rail. The linear bearing 139 is slidably mounted on the at least guide rod 127A-C and connected to the spring compression plate 138. As can be gathered from FIG. 6, preferably two of the linear bearings 139 are provided and used to guide the spring compression plate 138 on two of the rods 127A-C which act as guide rails.

A tensioner spring 144 is located between the tensioner spring support formed by the first end 124 of the housing 122 and the spring compression plate 138. The tensioner spring 144 is preferably a coil spring.

The spring compression plate 138 preferably includes an indicator, shown in detail in FIG. 5. The indicator in the second embodiment comprises a permanent magnet 142 attached to the spring compression plate 138.

A sensor 146, preferably in the form of a linear position sensor that can detect a position of a magnet located in proximity to the linear position sensor is located on the spring housing 122 that is configured to detect a position of the indicator 142. Other suitable position sensors could also be used.

The drive shaft 148 is rotationally fixed to the lead screw 134, preferably via a weld. However, the coupling sleeve 50 described above could also be used. The drive shaft 148 could also be fixed to the lead screw 134 using other means, such as a keyed or threaded connection, or the drive shaft 148 and the lead screw 134 could be formed as one piece. The drive shaft 148 is preferably splined or has a non-round shape in cross-section that extends consistently along its length to provide a rotational drive feature. In additional to known spline arrangements, this could include a hexagonal shape, a square shape, a circular shape with a flat, or any other known rotational drive shape.

Referring to FIGS. 5 and 6, in the second embodiment of the tensioning system 120, the lead screw 34 extends through an opening in the first housing end 124, and the drive shaft 148 extends through a guide bushing 156 mounted on the second housing end 126. The guide bushing 156 provides for smooth rotational support and guidance of the lead screw/drive shaft assembly 133.

In the second preferred embodiment, a wrench engagement surface 168, such as a hexagonal shaped end, is provided on an end of the lead screw/drive shaft assembly 133. In the second embodiment of the tensioning system 120, this is provided at the outer end of the lead screw 134. This allows for a manual engagement with a wrench in order to provide for a manual adjustment of the tensioning system, if necessary.

Still with reference to FIGS. 5 and 6, a driven wheel 160 is rotationally engaged with the drive shaft 148 and is axially slideable thereon. Preferably, a spline or other complementary shaped bushing 161 is located within the driven wheel 160 and locked in rotation with the driven wheel 160 that includes teeth or a corresponding shape to the rotational drive feature that are aligned with and slideable on the drive shaft 148. The bushing 161 can be combined with the guide bushing 156. This provides for rotational engagement of the driven wheel 160 with the drive shaft 148 while allowing for the axial sliding movement of the drive shaft 148 as the lead screw 134 is advanced or retracted.

As shown in FIGS. 5 and 6, a motor 162 is provided that drives the driven wheel 160. Preferably, a drive element connects the motor 162 to the driven wheel 160. This drive element can be a drive wheel 164 located on a shaft 163 of the motor 162 and a belt or chain 166 drivingly engaged between the drive wheel 164 and the driven wheel 160. Alternatively, the driven wheel 160 can have teeth and the drive wheel 164 can be a toothed gear that engages with the teeth of the driven wheel 160. In the second embodiment of the tensioning system 120, the motor 160 is advantageously located at the second housing end 126 where the system is mounted to the sprocket enclosure 80 resulting in enhanced support and a more compact arrangement.

As shown in FIG. 5, the controller 100 is provided that is configured to receive position data from the position sensor 146 and to actuate the motor 162 to drive the driven wheel 160 in a first rotational direction or a second rotational direction to rotate the lead screw 134 and advance or retract the lead screw 134 in the spring compression plate 138 to maintain or move the pushing face 136 to a desired position. This adjusts a tensioning force of the tensioner spring 144 located between the spring compression plate 138 and the first housing end 124 of the spring housing 122 to compensate for stretching of the traction element 12 or the load being carried. The controller 100 can be a PLC or any other programmable IC that can be programmed to provide for driving the motor 162 either in the clockwise or counterclockwise direction in order to adjust the lead screw 134 until the plate indicator 142 is within the desired positional range. This ensures that proper tension is applied via the pushing face 136 acting against the slideable carriage 16 in a similar manner to that illustrated in FIG. 3 so that the sprocket assembly 14 applies proper tension to the endless traction element 12 carried thereon.

In the second embodiment of the tensioning system 120, an optional pushing face position indicator 182 is shown. This is formed by a position plate 184 that is fixed in one axial position on the lead screw/drive shaft assembly 133 via a bushing arrangement 186 that allows the lead screw/drive shaft assembly 133 to rotate while being carried with it so that its axial position can be detected preferably using the linear position sensor 146. In the preferred embodiment, a magnet 188 is connected to the position plate 184 and the linear position sensor 146 detects the position of the lead screw/drive shaft assembly 133 which allows the position of the pushing face 136 to be determined. As shown in FIGS. 5 and 6, preferably at least one linear bushing 190 is connected to the position plate 184 and guides it on at least one of the rods 127A-C, which act as a guide rod. Those skilled in the art will recognize from the present disclosure that other types of position indicators can be used.

It will be appreciated by those skilled in the art that changes can be made to the embodiments of the invention described above without departing from the broad inventive concept thereof. It is also understood that various portions of the invention can be used alone or in combination and that not all of the components are required for any particular application. It is therefore understood that this invention is not limited to the particular embodiments disclosed, but it is intended to cover modifications within the spirit and scope of the present invention.

We claim:

1. A tensioning system for a conveying system with an endless traction element that travels around an adjustably mounted pulley or sprocket, the tensioning system comprising:

a spring housing having first and second housing ends opposite one another, the first housing end acts as a tensioner spring support;

a lead screw/drive shaft assembly including a threaded lead screw connected with a drive shaft located in the spring housing, the lead screw/drive shaft assembly having a pushing face that extends out of one of the housing ends;

a spring compression plate located in the spring housing and threadingly engaged with the lead screw, the spring compression plate including an indicator and an anti-rotation element;

a tensioner spring located between the tensioner spring support and the spring compression plate;

a sensor located on the spring housing that is configured to detect a position of the indicator;

a driven wheel that is rotationally engaged with the drive shaft and axially slideable thereon;

a motor that drives the driven wheel; and a controller configured to receive position data from the position sensor and to actuate the motor to drive the driven wheel in a first or second rotational direction to rotate the lead screw/drive shaft assembly and advance or retract the lead screw in the spring compression plate to maintain or move the pushing face to a desired position and to adjust a tensioning force of the tensioner spring.

2. The tensioning system of claim 1, wherein the spring housing includes at least one longitudinal opening, and the indicator is a plate indicator that extends through the longitudinal opening and simultaneously acts as the anti-rotation element.

3. The tensioning system of claim 1, wherein the lead screw extends through a forward guide bushing mounted to the second end, and the drive shaft extends through a rear guide bushing mounted to the first end.

4. The tensioning system of claim 1, further comprising at least one guide rail that extends between the first and second housing ends, and the anti-rotation element comprises a linear bearing slidably mounted on the at least guide rail and connected to the spring compression plate.

5. The tensioning system of claim 1, wherein the drive shaft is coupled to the lead screw with a coupling sleeve.

6. The tensioning system of claim 1, further comprising a drive element that connects the motor and the driven wheel.

7. The tensioning system of claim 1, further comprising a drive wheel located on the motor, and a belt or chain drivingly engaged between the drive wheel and the driven wheel.

8. The tensioning system of claim 1, wherein the sensor comprises first and second position sensors.

9. The tensioning system of claim 1, wherein the sensor comprises a linear position sensor that extends parallel to the lead screw/drive shaft assembly and the indicator comprises a magnet connected to the spring compression plate.

10. The tensioning system of claim 9, further comprising a second position indicator axially fixed to the lead screw/drive shaft assembly that is detected by the linear position sensor.

11. The tensioning system of claim 1, further comprising a wrench engagement surface located on an end of the lead screw/drive shaft assembly.

12. The tensioning system of claim 1, further comprising a nut on the spring compression plate that provides the threaded engagement with the lead screw.

13. The tensioning system of claim 1, wherein the second housing end acts as a mounting plate.

14. The tensioning system of claim 1, wherein the motor is mounted to the second housing end.

15. A conveying system, comprising:
the tensioning system according to claim 1;
a sprocket assembly that carries the endless traction element;
a slideable carriage on which the sprocket assembly is mounted; and
a sprocket enclosure, the second end of the spring housing being in proximity to or connected to the sprocket enclosure such that the pushing face contacts the slideable carriage to apply a tensioning force.

16. The conveying system of claim 15, further comprising longitudinally extending mounting rods in the sprocket enclosure, the slideable carriage being located on the longitudinally extending mounting rods.

17. The conveying system of claim 15, further comprising an endless traction element extending around the sprocket assembly.

18. The conveying system of claim 17, further comprising a conveying tube through which the endless traction element extends, and flights connected to the endless traction element that are adapted to carry granular or powdered product through the conveying tube.

\* \* \* \* \*

UNITED STATES PATENT AND TRADEMARK OFFICE
CERTIFICATE OF CORRECTION

PATENT NO. : 10,071,862 B1  
APPLICATION NO. : 15/916782  
DATED : September 11, 2018  
INVENTOR(S) : Daniel Joel Barry Page 1 of 1

It is certified that error appears in the above-identified patent and that said Letters Patent is hereby corrected as shown below:

In the Specification

At Column 2, Line 39, delete "limits" and insert therefor -- limits. --.

At Column 4, Line 36, delete "lead screw 48." and insert therefor -- lead screw 34. --.

At Column 7, Line 49, delete "motor 160" and insert therefor -- motor 162 --.

In the Claims

At Column 9, Line 11, in Claim 4, delete "guide rail" and insert therefor -- one guide rail --.

Signed and Sealed this  
Thirteenth Day of November, 2018

Andrei Iancu  
*Director of the United States Patent and Trademark Office*